United States Patent
Bean et al.

(10) Patent No.: US 10,202,666 B2
(45) Date of Patent: Feb. 12, 2019

(54) PROCESS FOR TREATING STEEL ALLOYS FOR GEARS

(71) Applicant: UNITED TECHNOLOGIES CORPORATION, Hartford, CT (US)

(72) Inventors: Mathew J Bean, Willington, CT (US); William P Ogden, Glastonbury, CT (US); Todd J Angus, Weatogue, CT (US); Neil E. Anderson, Berlin, CT (US)

(73) Assignee: United Technologies Corporation, Farmington, CT (US)

( * ) Notice: Subject to any disclaimer, the term of this patent is extended or adjusted under 35 U.S.C. 154(b) by 591 days.

(21) Appl. No.: 14/775,945

(22) PCT Filed: Dec. 30, 2013

(86) PCT No.: PCT/US2013/078181
§ 371 (c)(1),
(2) Date: Sep. 14, 2015

(87) PCT Pub. No.: WO2014/143361
PCT Pub. Date: Sep. 18, 2014

(65) Prior Publication Data
US 2016/0002747 A1    Jan. 7, 2016

Related U.S. Application Data

(60) Provisional application No. 61/787,981, filed on Mar. 15, 2013.

(51) Int. Cl.
| | | |
|---|---|---|
| *C21D 9/32* | (2006.01) | |
| *C23C 8/22* | (2006.01) | |
| *C21D 1/00* | (2006.01) | |
| *C23C 8/02* | (2006.01) | |
| *C23C 8/10* | (2006.01) | |
| *C23C 8/20* | (2006.01) | |
| *C23C 8/34* | (2006.01) | |
| *C23C 8/80* | (2006.01) | |
| *C25D 7/00* | (2006.01) | |
| *C21D 1/18* | (2006.01) | |
| *C22C 38/02* | (2006.01) | |
| *C22C 38/04* | (2006.01) | |
| *C22C 38/42* | (2006.01) | |
| *C22C 38/44* | (2006.01) | |
| *C22C 38/46* | (2006.01) | |
| *C22C 38/52* | (2006.01) | |
| *C23C 30/00* | (2006.01) | |
| *F16H 55/17* | (2006.01) | |
| *C23C 8/04* | (2006.01) | |
| *C25D 5/02* | (2006.01) | |
| *C23C 18/16* | (2006.01) | |

(52) U.S. Cl.
CPC ............ *C21D 9/32* (2013.01); *C21D 1/00* (2013.01); *C21D 1/18* (2013.01); *C22C 38/02* (2013.01); *C22C 38/04* (2013.01); *C22C 38/42* (2013.01); *C22C 38/44* (2013.01); *C22C 38/46* (2013.01); *C22C 38/52* (2013.01); *C23C 8/02* (2013.01); *C23C 8/04* (2013.01); *C23C 8/10* (2013.01); *C23C 8/20* (2013.01); *C23C 8/22* (2013.01); *C23C 8/34* (2013.01); *C23C 8/80* (2013.01); *C23C 30/005* (2013.01); *C25D 7/00* (2013.01); *F16H 55/17* (2013.01); *C23C 18/1603* (2013.01); *C25D 5/02* (2013.01)

(58) Field of Classification Search
CPC .... C23C 8/22; C23C 8/32; C23C 8/80; C23C 8/34; C21D 9/32; C21D 1/18; C21D 8/34; C22C 38/52; C22C 38/46; C22C 38/44; C22C 38/42; C22C 38/02; C22C 38/04
See application file for complete search history.

(56) References Cited

U.S. PATENT DOCUMENTS

| | | | |
|---|---|---|---|
| 3,885,995 A | 5/1975 | Cunningham et al. | |
| 4,855,556 A * | 8/1989 | Mucha ..................... | C21D 9/32 |
| | | | 219/640 |
| 5,593,510 A | 1/1997 | Tahara et al. | |
| 6,101,719 A | 8/2000 | Kiuchi et al. | |
| 7,208,052 B2 | 4/2007 | Hammond et al. | |
| 7,648,588 B2 | 1/2010 | Hammond et al. | |
| 2003/0040401 A1 | 2/2003 | Okita et al. | |
| 2009/0308497 A1 | 12/2009 | Jo et al. | |
| 2011/0108164 A1 | 5/2011 | Jain et al. | |

FOREIGN PATENT DOCUMENTS

| | | |
|---|---|---|
| WO | WO9812361 | 3/1998 |
| WO | WO0009776 | 2/2000 |
| WO | WO0168933 | 9/2001 |

OTHER PUBLICATIONS

EP Office Action dated May 12, 2017 for EP Application No. 13877876.6.
European Extended Search Report dated Sep. 15, 2016, issued in the corresponding European Patent Application No. 13877876.6.
A K Rakhit, "Heat Treatment of Gears, A Practical Guide for Engineers", Dec. 1, 2000, XP055286283, DOI: 10.1361/htoh2000p033, ISBN: 978-0-87170-694-2, URL:http://allaboutmetallurgy.com/wp/wp-content/uploads/ASM-Heat Treatment of Gears a Practical Guide for Engineers.pdf.
Zhichao Li et al, "Modeling the Effect of Carburization and Quenching on the Development of Residual Stresses and Bending Fatigue Resistance of Steel Gears", Journal of Materials Engineering and Performance., vol. 22, No. 3, Jul. 24, 2012, pp. 664-672, XP055259357, ISSN: 1059-9495, DOI: 10.1007/s11665-012-0306-0.

(Continued)

*Primary Examiner* — Jessee R Roe
(74) *Attorney, Agent, or Firm* — Bachman & LaPointe, P.C.

(57) ABSTRACT

A process for treating a steel alloy component includes the steps of: providing a steel alloy component having a plurality of teeth with a root portion and a tip; and processing the steel alloy so that the root portion of the gear teeth are hardened without through hardening of the tips of the gear teeth.

12 Claims, 2 Drawing Sheets

(56) References Cited

OTHER PUBLICATIONS

Carpenter Technology Corporation: "Technical Datasheet Pyrowear 675 Stainless", Sep. 29, 2009, pp. 1-12, XP002752452, URL:http://cartech.ides.com/datasheet.aspx?i=101&e=69&c=TechArt.
Carpenter Technology Corporation: "Pyrowear Alloy 53, Technical Datasheet", Sep. 8, 2003, XP055286535, URL:https://www.cartech.com/ssalloysprod.aspx?id=2140.
Michael L. Schmidt; "Preoxidation Prior to Gas Carburizing: Theory and Its Effect on Pyrowear 53 Alloy"; 1990 Springer-Verlag New York Inc.; J. Heat Treat. (1990) 8:5-19; vol. 8, No. 1.

* cited by examiner

PROCESS FOR TREATING STEEL ALLOYS FOR GEARS

BACKGROUND

The present disclosure is directed to a process for treating steel alloys, such as PYROWEAR® alloys, used for components, such as gears.

In the design and manufacture of steel components, there is often a need to modify properties of the material. It is well recognized that carburizing is a process suited for hardening the surface and sub-surface of the steel component. Carburizing can be broadly considered as either an atmospheric carburization process or a vacuum carburization process. In the vacuum carburization process, the component is heated to an elevated temperature within a carburizing furnace, and a carburizing gas is introduced into the environment so that carbon atoms are diffused into the surface and sub-surface of the steel material. The carbon content in the surface and near sub-surface of the component is increased while the carbon content within the core of the component remains unaltered. The characteristics of the component have this been modified to provide a hardened outer surface surrounding an interior core.

It has been suggested that, when using a stainless steel, such as PYROWEAR® 675, one should first oxidize the surface of the component prior to exposure to the carburizing environment. In such a process, the component is grit blasted and placed in an air furnace at a temperature of 1300 degrees Fahrenheit for about one hour to form an oxide on its surface. Upon the component being subjected to the carburizing environment, the oxidized surface facilitates the absorption of carbon by the material.

In a carburizing process, the time and temperature that the material is subjected to while in the carburizing environment will determine the surface hardness, case depth, hardness profile, and carbide microstructure of the hardened portion of the material.

Gears made from steel alloys need to have the proper hardness of the gear teeth without through hardening of the tips of the gear teeth.

SUMMARY

There is provided in accordance with the present disclosure a process for treating a steel alloy component, which broadly comprises the steps of: providing a steel alloy component having a plurality of teeth with a root portion and a tip; and processing the steel alloy so that the root portion of the gear teeth are hardened without through hardening of the tips of the gear teeth.

In another and alternative embodiment, the processing step comprises: subjecting the steel alloy component to a pre-oxidation step in an air; and subjecting the steel alloy component to a carburization treatment.

In another and alternative embodiment, the pre-oxidation step comprises heat treating the steel alloy component in air at a temperature in the range of from 800 to 1300 degrees Fahrenheit for one hour.

In another and alternative embodiment, the processing step further comprises copper plating at least a portion of the steel alloy component prior to the pre-oxidation step.

In another and alternative embodiment, the carburization treatment is an atmospheric carburization treatment.

In another and alternative embodiment, the carburization treatment comprises placing the steel alloy component in a carburizing furnace and subjecting the steel alloy component to a temperature in the range of from 1650 to 1710 degrees Fahrenheit.

In another and alternative embodiment, the processing step further comprises subjecting the steel alloy component to an austenitizing treatment after the carburizing treatment.

In another and alternative embodiment, the austenitizing treatment is carried out at a temperature in the range of from 1650 to 1750 degrees Fahrenheit.

In another and alternative embodiment, the processing step further comprises quenching the steel alloy component at a temperature in the range of from 75 to 140 degrees Fahrenheit.

In another and alternative embodiment, the processing step further comprises subjecting the steel alloy component to a cold treatment at a temperature in the range of from −94 to −112 degrees Fahrenheit.

In another and alternative embodiment, the processing step further comprises air warming the steel alloy component to room temperature.

In another and alternative embodiment, the processing step further comprises subjecting the steel alloy component to a temper treatment at a temperature in the range of from 425 to 475 degrees Fahrenheit.

In another and alternative embodiment, the steel alloy component providing step comprises providing a steel alloy component formed from an alloy consisting of from 0.05 to 0.10 wt % carbon, from 0.35 to 0.65 wt % manganese, from 0.4 to 1.0 wt % silicon, from 1.0 to 13 wt % chromium, from 2.0 to 3.0 wt % nickel, from 1.8 to 3.25 wt % molybdenum, up to 2.0 wt % copper, up to 5.4 wt % cobalt, from 0.1 to 0.6 wt % vanadium, and the balance iron.

In another and alternative embodiment, the steel alloy component providing step comprises providing a gear formed from the steel alloy.

Further in accordance with the present disclosure, there is provided a gear which broadly comprises the gear being formed from a steel alloy; the gear having a plurality of teeth; each tooth having a root portion and a tip; and the root portion being hardened without the tip being through hardened.

In another and alternative embodiment, the steel alloy has a composition consisting of from 0.05 to 0.10 wt % carbon, from 0.35 to 0.65 wt % manganese, from 0.4 to 1.0 wt % silicon, from 1.0 to 13 wt % chromium, from 2.0 to 3.0 wt % nickel, from 1.8 to 3.25 wt % molybdenum, up to 2.0 wt % copper, up to 5.4 wt % cobalt, from 0.1 to 0.6 wt % vanadium, and the balance iron.

Other details of the process for treating steel alloys for gears are set forth in the following detailed description and the accompanying drawing wherein like reference numerals depict like elements.

DETAILED DESCRIPTION

Figure 1:
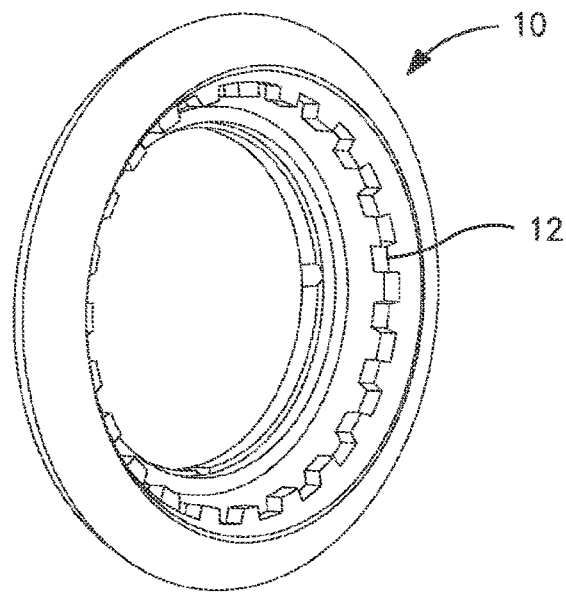
FIG. 1 is a schematic representation of a gear having a plurality of teeth.

FIG. 1 illustrates a gear 10 having a plurality of teeth 12. The gear 10 and the teeth 12 may be formed from a steel alloy such as a PYROWEAR® alloy. The steel alloy may have a composition which consists of from 0.05 to 0.10 wt % carbon, from 0.35 to 0.65 wt % manganese, from 0.4 to 1.0 wt % silicon, from 1.0 to 13 wt % chromium, from 2.0 to 3.0 wt % nickel, from 1.8 to 3.25 wt % molybdenum, up to 2.0 wt % copper, up to 5.4 wt % cobalt, from 0.1 to 0.6 wt % vanadium, and the balance iron.

Figure 2:
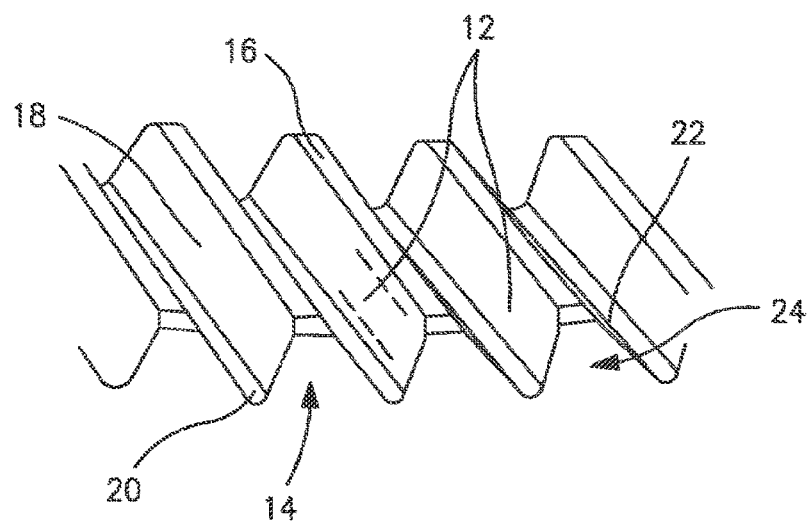
FIG. 2 is an enlarged view of the gear teeth.

Referring now to FIG. 2, there is shown a plurality of the teeth 12 in the gear 10. Each of the teeth 12 has a root 14 and a tip 16. The tip 16 may be formed as a top land which does not act as a working surface. Each tooth 12 further has a drive flank 18 which is a working surface. Adjacent teeth 12 may be connected by a fillet 20 which is also a non-working surface. Each tooth 12 further has a non-driving flank 22, which may be a non-working surface, and end faces 24 which are non-working surfaces.

It is important to have a process for treating the material forming the gear 10 so that the root 14 of the each tooth 12 has the proper hardness without there being through hardening of the tips 16 of the gear teeth 12.

Figure 3:
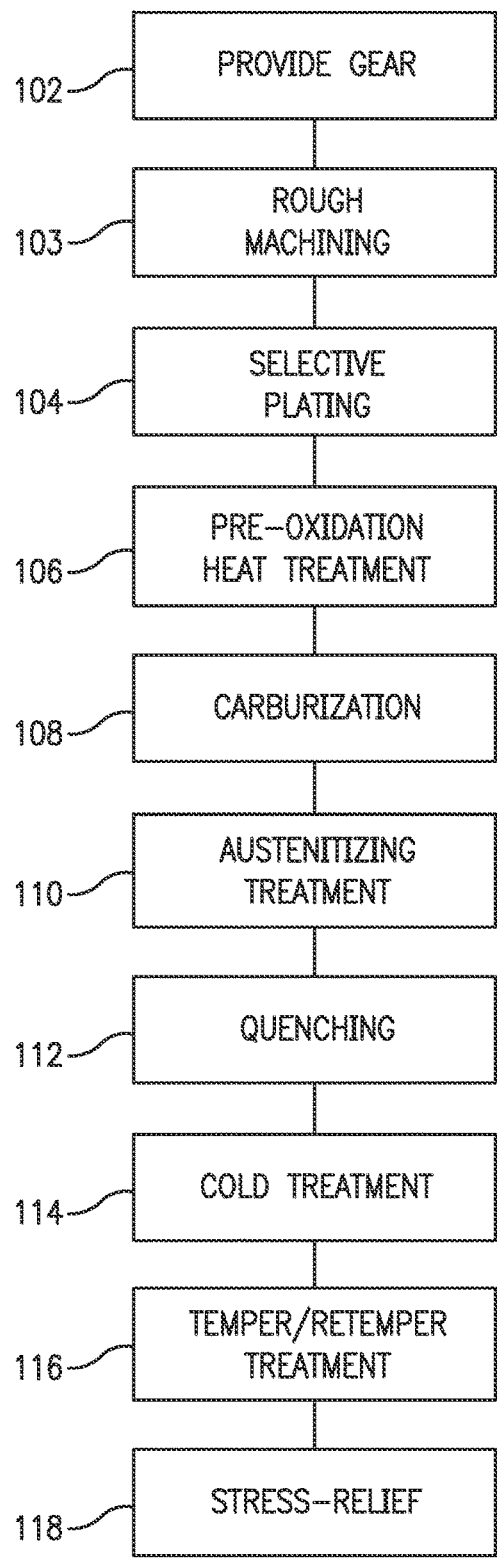
FIG. 3 is a schematic representation of a process for hardening the gear teeth in accordance with the present disclosure

Referring now to FIG. 3, there is shown a process for treating a gear 10 having teeth 12 to arrive at the desired hardness properties. In step 102, a rough machine gear 10 having a plurality of teeth 12 is provided. The rough machine gear 10 may be made from a steel alloy such as those discussed above. In step 103, rough machining of the gear 10 may occur.

In step 104, portions of the gear 10, such as the tips 16 and the end faces 24, may be selectively plated with a metal, such as copper or a copper alloy, to prevent over-carburization. If desired, the entire gear 10 may be copper plated. The plating metal may be deposited in a layer having a thickness in the range of from 0.010 mm to 0.030 mm. The plating metal may be deposited on the desired portions of the gear 10 using any suitable technique such as an electroless plating technique or an electroplating (galvanic) technique. The metal deposit allows selective carburizing.

In step 106, the gear may be subjected to a pre-oxidation heat treatment to activate the steel alloy to accept the carbon which comes from a subsequent carburization process. The pre-oxidation heat treatment comprises placing the gear in a furnace having an air atmosphere and heating the gear for one hour at a temperature in the range of from 800 to 1300 degrees Fahrenheit. It has been found that this pre-oxidation heat treatment helps form the desired hardness properties in the root 14 while avoiding through hardness of the tip 16. When the pre-oxidizing treatment is done at 1300 degrees Fahrenheit, it provides careful control of the oxide film that is formed. After the pre-oxidation heat treatment is completed, the gear 10 may be removed from the furnace and allowed to cool.

In step 108, the plated gear may be placed into a furnace and subjected to a carburization treatment. Carburization in general includes subjecting the gear 10 to an environment wherein carbon atoms can be diffused into the material through the outer surface of the gear 10. The carburization treatment may be an atmospheric treatment where a carburizing gas is introduced into the furnace. The carburizing gas may be propane, methane, acetylene, and combinations thereof. During the carburization treatment, the plated gear may be placed in a carburizing furnace and heated to a carburizing temperature in the range of from 1650 to 1710 degrees Fahrenheit for a time which is dependent on the case depth requirement.

In step 110, the gear 10 may be subjected to an austenitizing treatment where it is heated to an austenitizing temperature in the range of from 1650 to 1750 degrees Fahrenheit in a furnace such as an air furnace or a plasma furnace. During the austenitizing treatment, ferrite particles in the steel forming the gear 10 are transformed to austenite particles.

In step 112, the gear 10 may be quenched at a temperature in the range of from 75 to 140 degrees Fahrenheit at the beginning of the quenching operation. The quenching step may be carried out in tanks which allow continuous quenching and free movement of the gear 10 within the quench media. The quench media may be oil or water.

In step 114, the gear 10 may be cold treated, using a cryogenic deep freezing technique, at a temperature in the range of from −94 to −112 degrees Fahrenheit for a minimum of 2.0 hours. After this step is performed, the gear 10 may be air warmed to room temperature.

In step 116, the gear 10 may be subjected to a temper/retemper treatment in an air furnace at a temperature in the range of from 425 to 475 degrees Fahrenheit for a minimum of 2.0 hours.

In step 118, if needed, the gear 10 may be subjected to a stress relief heat treatment which may be carried at a temperature in the range of from 350 to 400 degrees Fahrenheit for a time period in the range of from 1.0 to 2.0 hours.

The heat treatment described herein may be used for any highly stressed gear with a small root radius that could not have the gear teeth through hardened, since that may make the gear teeth brittle and cause a fracture.

The gear 10 described herein is merely illustrative and is not intended to be limiting. The process described herein may be applicable for use on any type of gear with no limitation intended based on the specific type of gear. The process herein may also be used on other types of components formed from a steel alloy.

While one of the embodiments described herein is directed to a specific family of steel alloys, the description is exemplary in nature and should not be construed in a limiting sense.

There has been provided a heat treatment for steel alloys for gears. While the heat treatment has been described in the context of specific embodiments thereof, unforeseen alternatives, modifications, and variations may become apparent to those skilled in the art having read the foregoing description. Accordingly, it is intended to embrace those alternatives, modifications, and variations as fall within the broad scope of the appended claims.

What is claimed is:

1. A process for treating a steel alloy component, comprising the steps of:
   providing a steel alloy component having a plurality of teeth with a root portion and a tip; and
   processing said steel alloy so that said root portion of said gear teeth are hardened without through hardening of the tips of the gear teeth, wherein said processing step comprises: subjecting said steel alloy component to a pre-oxidation step in air; and subjecting said steel alloy component to a carburization treatment, wherein said processing step further comprises copper plating at least a portion of said steel alloy component prior to said pre-oxidation step.

2. The process of claim 1, wherein said pre-oxidation step comprises heat treating said steel alloy component in air at a temperature in the range of from 800 to 1300 degrees Fahrenheit for one hour.

3. The process of claim 1, wherein said steel alloy component providing step comprises providing a gear formed from a steel alloy.

4. The process of claim 1, wherein said carburization treatment is an atmospheric carburization treatment.

5. The process of claim 1, wherein said carburization treatment comprises placing said steel alloy component in a carburizing furnace and subjecting the steel alloy component to a temperature in the range of from 1650 to 1710 degrees Fahrenheit.

6. A process for treating a steel alloy component, comprising the steps of:

providing a steel alloy component having a plurality of teeth with a root portion and a tip;

processing said steel alloy so that said root portion of said gear teeth are hardened without through hardening of the tips of the gear teeth; wherein said processing step comprises: subjecting said steel alloy component to a pre-oxidation step in air; and subjecting said steel alloy component to a carburization treatment; wherein said processing step further comprises subjecting said steel alloy component to an austenitizing treatment after said carburizing treatment.

7. The process of claim 6, wherein said austenitizing treatment is carried out at a temperature in the range of from 1650 to 1750 degrees Fahrenheit.

8. The process of claim 6, wherein said processing step further comprises quenching said steel alloy component at a temperature in the range of from 75 to 140 degrees Fahrenheit.

9. The process of claim 8, wherein said processing step further comprises subjecting said steel alloy component to a cold treatment at a temperature in the range of from −94 to −112 degrees Fahrenheit.

10. The process of claim 9, wherein said processing step further comprises air warming the steel alloy component to room temperature.

11. The process of claim 10, wherein said processing step further comprises subjecting said steel alloy component to a temper treatment at a temperature in the range of from 425 to 475 degrees Fahrenheit.

12. A process for treating a steel alloy component, comprising the steps of:

providing a steel alloy component having a plurality of teeth with a root portion and a tip; wherein said steel alloy component providing step comprises providing a steel alloy component formed from an alloy consisting of from 0.05 to 0.10 wt % carbon, from 0.35 to 0.65 wt % manganese, from 0.4 to 1.0 wt % silicon, from 1.0 to 13 wt % chromium, from 2.0 to 3.0 wt % nickel, from 1.8 to 3.25 wt % molybdenum, up to 2.0 wt % copper, up to 5.4 wt % cobalt, from 0.1 to 0.6 wt % vanadium, and the balance iron; and processing said steel alloy so that said root portion of said gear teeth are hardened without through hardening of the tips of the gear teeth.

\* \* \* \* \*